(12) United States Patent
Behroozi

(10) Patent No.: US 12,402,721 B2
(45) Date of Patent: Sep. 2, 2025

(54) SUPPORT PANEL WITH TRANSIT TABS

(71) Applicant: Beanius, LLC, Brooklyn, NY (US)

(72) Inventor: Ryan H. Behroozi, Brooklyn, NY (US)

(73) Assignee: Beanius, L.L.C., Brooklyn, NY (US)

( * ) Notice: Subject to any disclaimer, the term of this patent is extended or adjusted under 35 U.S.C. 154(b) by 0 days.

(21) Appl. No.: 18/101,876

(22) Filed: Jan. 26, 2023

(65) Prior Publication Data
US 2024/0251938 A1 Aug. 1, 2024

(51) Int. Cl.
*A47B 23/04* (2006.01)
*F16M 11/10* (2006.01)

(52) U.S. Cl.
CPC ........... *A47B 23/043* (2013.01); *F16M 11/10* (2013.01)

(58) Field of Classification Search
CPC .............................. A47B 23/043; F16M 11/10
USPC ... 248/346.01, 346.03, 346.06, 346.5, 309.1, 248/311.2, 441.1, 444; 211/126.1, 126.5, 211/133.1, 133.3
See application file for complete search history.

(56) References Cited

U.S. PATENT DOCUMENTS

| | | | | |
|---|---|---|---|---|
| 3,707,242 A * | 12/1972 | Golden | ..................... | E06C 7/14 220/570 |
| 3,991,967 A | 11/1976 | Sack | | |
| 4,815,684 A * | 3/1989 | Kellstadt | ................... | E06C 7/14 248/210 |
| 4,991,812 A | 2/1991 | MacEwan | | |
| 5,402,910 A * | 4/1995 | Pilney | ...................... | B44D 3/12 220/570 |
| 6,089,351 A * | 7/2000 | Ahl | .......................... | E06C 7/14 248/210 |
| 6,860,458 B1 | 3/2005 | Pagano | | |
| 10,420,418 B2 | 9/2019 | Behroozi | | |
| 2017/0223862 A1 | 8/2017 | Justiss et al. | | |

* cited by examiner

*Primary Examiner* — Alfred J Wujciak
(74) *Attorney, Agent, or Firm* — Keusey & Associates, P.C.

(57) ABSTRACT

A movable fixture for supporting an object including a planar support panel and transit tabs. The planar support panel has left and right rear legs to position the planar support panel at a viewing angle when sitting on a horizontal surface. A transit tab extends outwardly from the rear surface at a location that is hand-accessible through a gap bordered by one of the lateral edges of the panel and the respective rear leg. The transit tab properly positions the user's hand to ergonomically grasp the object and panel for secure movement.

20 Claims, 4 Drawing Sheets

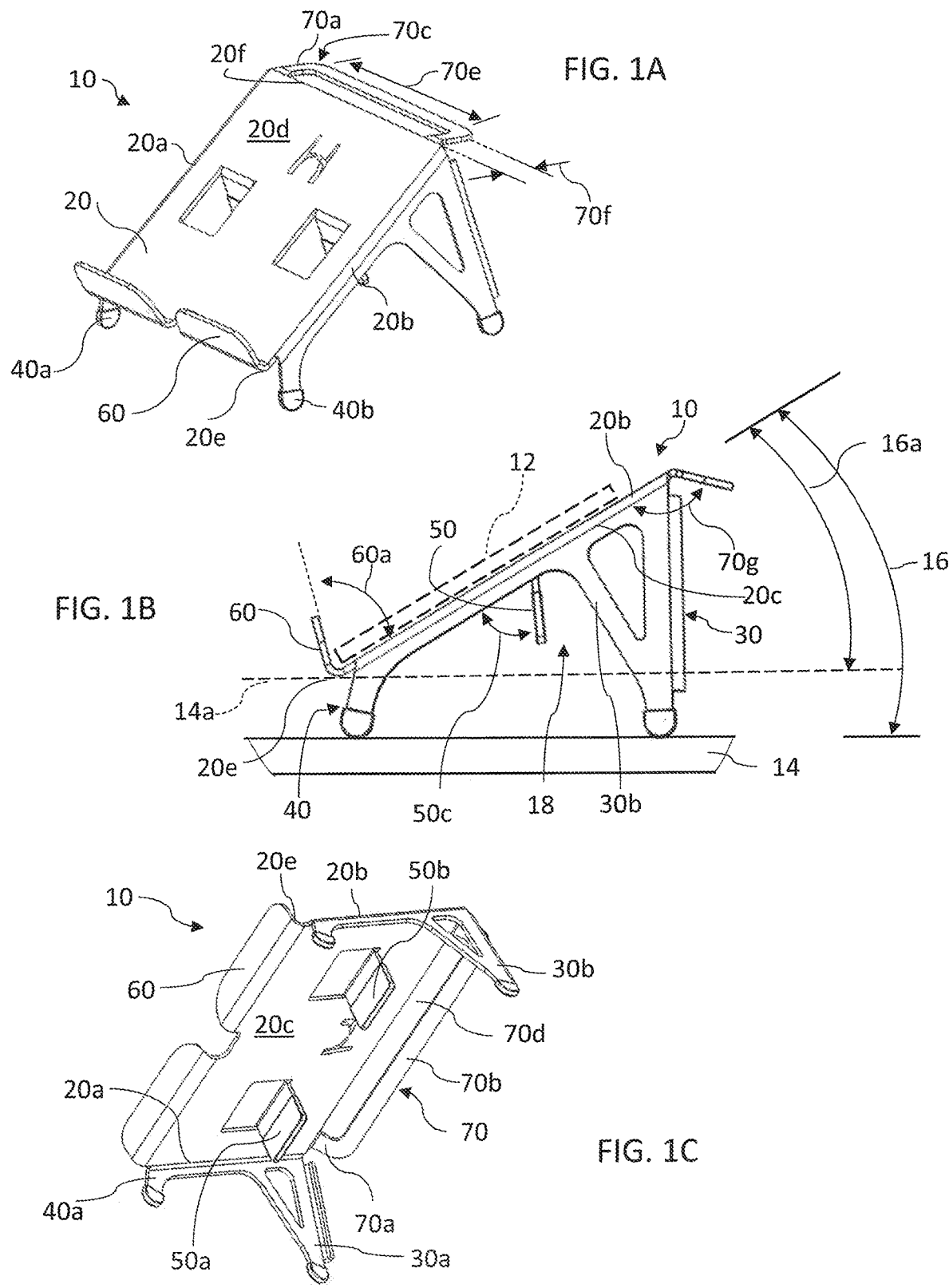

SUPPORT PANEL WITH TRANSIT TABS

BACKGROUND OF THE INVENTION

1. Field of the Invention

The invention relates to a support panel with transit tabs that can be used to support an object like, but not limited to, a book or electronic device such as a cellular telephone or tablet computer.

2. The Prior Art

Flexible, ergonomic access to media including books and electronic devices such as cellular telephones or tablet computers is needed in many work environments. This is especially true in the kitchen where a large variety of simple and complex tasks can be influenced by numerous informational and physical inputs relating to ingredients, cooking processes, appliances, kitchen tools, etc. In the kitchen, the user can perform work at several different locations including prep areas, sinks, stove, etc. As such, a device designed to enable easy moving and ergonomic repositioning of a large format information interface, such as a tablet computer, on a worksurface would be highly desirable.

Ideally, this device for easily moving and ergonomically repositioning a tablet computer, would be easy to firmly grip and move while providing manipulative access to clamp the tablet in place by hand on the device while moving it. Furthermore, it would be highly desirable for the device to be able to fluidly engage a means, such as an adjustable bracket with rungs, located above the worksurface or elsewhere, so that the tablet is ergonomically accessible for manipulation and viewing without taking up space on the worksurface. Since the kitchen workplace can be messy with ingredients spilling or spattering in the work areas, it would also be desirable for the device to be easy to clean, with minimal moving parts, and also have a minimal contact area with the worksurface when sitting on a worksurface that is subject to spills.

U.S. Pat. No. 3,991,967 (Sack), U.S. Pat. No. 6,860,458 (Pagano), U.S. Pat. No. 4,991,812 (MacEwan), and Patent Application 2017/0223862 show angled support surfaces with triangular openings to allowing reach through to grip the support surfaces with the hand. However, in all cases, the supporting structure below the support surface would obstruct engagement with any type of bracket with rungs. Also, these devices do not show transit tabs specifically dimensioned and purposed to be gripped by the fingers. Furthermore, when lifted by hand, some of these devices may collapse or disengage where their angular adjustment depends on their being stationary. Also, many of these devices have multiple moving parts and considerable contact areas with the worksurface which make them more vulnerable to dirt and more difficult to clean.

U.S. Pat. No. 10,420,418 (Behroozi) shows a support surface that can engage a suspended bracket using tabs, however the tabs are not sized, positioned, or oriented to facilitate griping by the hand. Furthermore, while the same bracket can be used as a countertop stand for the support surface, it requires a reconfiguration procedure. As such, there is no means for the fluid transit of the support surface between the suspended bracket and the countertop.

SUMMARY OF THE INVENTION

It is an object of the present invention to provide a planar support to display the object at a comfortable viewing angle when sitting on a horizontal surface.

It is a further object that the invention would include one long unobstructed transit tab or two shorter unobstructed transit tabs for collectively gripping an object and the planar support panel on which that object rests to securely transport the object to a different location.

It is another object that the transit tabs would also be positioned and sufficiently unobstructed so that they can firmly engage rungs in a ladder arrangement with that ladder arrangement capable of being positioned in a variety of locations and orientations, providing convenient, ergonomic viewing and manipulative access to the objects being supported.

These and other related objects are achieved by an embodiment of a movable fixture for supporting an object having a planar support panel and transit tabs. The planar support panel has a rear surface, a finger spaced from the rear surface, and left and right lateral edges with left and right rear legs extending from respective left and right lateral edges to position the planar support panel at a viewing angle when sitting on a horizontal surface. The transit tab extends outwardly from the rear surface at a location that is hand-accessible through a gap bordered by one of the lateral edges and the respective rear leg. The transit tab is oriented at a gripping angle that is adapted to capture a rung between the transit tab and the rear surface with the ladder engaged within the finger to suspend the planar support panel within a workspace.

The planar support panel has a front surface, a bottom edge and an object retaining lip along at least a portion of the bottom edge extending outwardly from said planar support panel to form an angle with the front surface between about 45 and 90 degrees. The planar support panel further includes left and right front legs, wherein the rear legs are between about 2 to 8 times longer than the front legs. The transit tab is hand-accessible through a gap between the front and rear legs on one side thereof. The planar support panel has a top edge and a handle comprising the finger with two returns peripherally connected to the top edge at two locations near the lateral edges and a grip spaced from a central portion of the top edge to form a slot which is longer than the transit tab. The handle forms a handle angle with the rear surface of the planar support panel between about 110 and 160 degrees.

The fixture further includes a ladder with rungs that hangs at a viewable location within the workspace. The ladder extends through the slot with the rungs selectively capturable between the transit tab and the rear surface. The slot is dimensioned and configured so that the planar support panel can pivot about the ladder so that the transit tab can pass by the rungs and then allow the ladder to lie flat against the rear surface when the transit tab captures a selected rung. In a first plane of the handle the slot is between 3 and 5 times wider than the ladder. In a second plane of the rear surface the slot has a width several millimeters wider than the ladder. The fixture further includes a bracket to flexibly hang the ladder in various positions. The bracket flexibly hangs the ladder in various positions selected from the group consisting of different locations, multiple rotational orientations, various angles and combinations thereof.

The left and right rear legs are spaced a distance D from each other and the slot has a length less than distance D. The transit tab includes a left transit tab disposed within about 1-4 inches from the left lateral edge and a right transit tab disposed within about 1-4 inches from the right lateral edge. The distance from a left side of the left transit tab to a right side of the right transit tab is less than the slot length.

The fixture is fabricated from a single piece of rigid sheet material having a rectangular section removed to form the slot and having a U-shaped section removed to form the transit tab. The handle consists of a C-shaped portion of the sheet material bent away from the front surface in the direction of the rear surface. The C-shaped portion is narrower than the rear legs. The transit tab consists of a rectangular portion of the sheet material within the removed U-shaped section bent away from the front surface in the direction of the rear side, wherein the transit tab extends vertically downward when the planar support panel is sitting on a horizontal surface.

The fixture further includes a skirt extending from a lateral edge generally perpendicular to the planar support surface in the same direction as a rear leg. The fixture also includes a cradle at a lateral edge adapted to guide and support a user's hand when accessing the transit tab. The skirt merges with a leg in a smooth curve to form the cradle. The transit tab is located between a top edge and a bottom edge at a center of gravity of the planar support panel.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIG. 1A is a top, front, right side perspective view of an embodiment of a movable fixture according to the invention.

FIG. 1B is a right side elevational view thereof.

FIG. 1C is a bottom, front, right side perspective view thereof.

DETAILED DESCRIPTION OF THE PREFERRED EMBODIMENTS

Figure 2A:
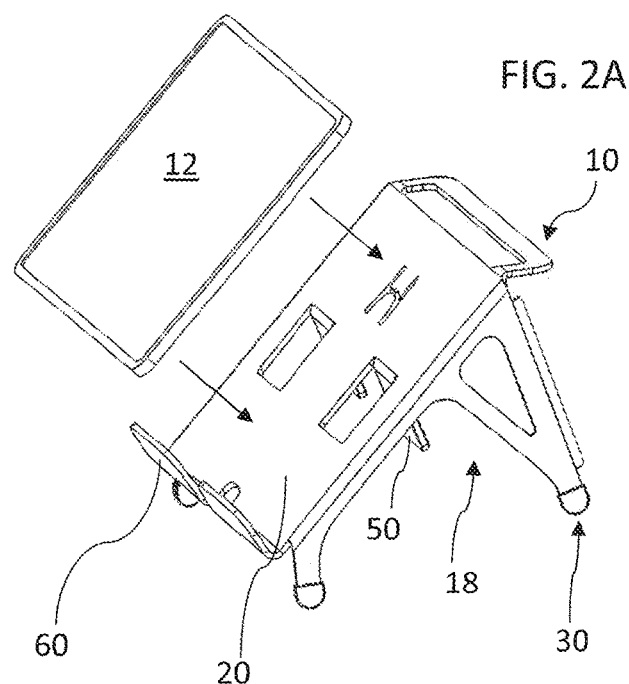
FIGS. 2A, 2B, 2C and 2D are a series of views illustrating the hand accessibility of the transit tabs.

Referring now in detail to the drawings, and in particular FIGS. 1A, 1B and 1C, there is shown a movable fixture 10 for supporting an object 12 like a book or electronic device such as a cellular telephone or tablet. The fixture provides a planar support panel 20 to display the object at a comfortable viewing angle 16 when sitting on a horizontal surface 14. The fixture includes one long transit tab 50 or two shorter transit tabs 50a, 50b for collectively gripping object and planar support panel 20 to securely transport the object to a different location.

Planar support surface 20 has a rear surface 20c with a left lateral edge 20a and a right lateral edge 20b. A left rear leg 30a extends from the left lateral edge 20a and a right rear leg 30b extends from the right lateral edge 20b. The rear legs 30 form an angle with rear surface 20c of 90 degrees to 100 degrees. Planar support surface 20 has a front surface 20d with a bottom edge 20e. An object retaining lip 60 extends outwardly along at least a portion of bottom edge 20e. Object retaining lip 60 forms a lip angle 60a with front surface 20d between about 45 and 90 degrees. In one embodiment, bottom edge 20e rests on alternate horizontal surface 14a to form a convenient viewing angle 16a.

A transit tab 50 extends outwardly from rear surface 20c at a location that is hand-accessible through a gap 18 bordered by one of the lateral edges and the respective rear leg. As shown in FIG. 1B, gap 18 is generally in the shape of a triangle bordered on the top left by right lateral edge 20b, bordered on the top right by right rear leg 30b, and bordered on the bottom by alternate horizontal surface 14a. As can be seen in FIG. 1C, right transit tab 50b is spaced from right lateral edge 20b about 1 inch as will be discussed further below. Beyond the one inch spacing, right transit tab 50b extends between 2 and 4 inches from right lateral edge 20b. Similarly, left transit tab 50a is spaced from left lateral edge 20a about 1 inch as will be discussed further below. Beyond the one inch spacing, left transit tab 50a extends between 2 and 4 inches from left lateral edge 20a. In the case of a single transit tab, the left and right transit tabs would each be extended toward the center of the rear surface and merge together. Legs 30, 40 and transit tabs 50a, 50b are depicted with boots on their lower free ends thereof. The boots are made from a soft touch material, for example, rubber or soft plastic. The boots on the legs will prevent the bottom of the legs from scratching the horizontal surface on which they are placed. The boots on the transit tabs protects the user's fingers from any sharp edges. In addition, the boots can be easily cleaned or replaced as the legs and transit tabs will have the most contact with fingers and surfaces, for example, kitchen counter-tops.

In a further embodiment, a left front leg 40a extends from the left lateral edge 20a and a right front leg 40b extends from the right lateral edge 20b. Rear legs 30 are about 2 to 8 times longer than front legs 40. A particular length is selected based on the planar support panel dimensions in order to achieve the desired viewing angle 16 with respect to horizontal surface 14. When front legs are present, the transit tab is hand-accessible through a gap between the front and rear legs on one side thereof. Transit tab 50 extends generally vertically, or within 10 degrees from vertical when the movable fixture is sitting on a horizontal surface. Transit tab 50 is oriented at a gripping angle 50c with respect to rear surface 20c, for example, an acute angle, and more particularly, between about 20-70 degrees.

Planar support panel has a top edge 20f and a handle 70 with two returns 70a connected to peripheral sections of top edge 20f. A grip 70b connects between returns 70 and is spaced from a central portion of top edge 20f to form a slot 70d. Slot 70d has a slot length 70e and a first slot width 70f in the plane of the handle. Slot length 70e is longer than the maximum distance from end to end of the transit tab or tabs. Slot length 70e is shorter than the distance between the rear legs. The handle 70, or C-shaped portion 70c, forms a handle angle 70g with rear surface 20c between about 110 and 160 degrees.

Figure 2B:
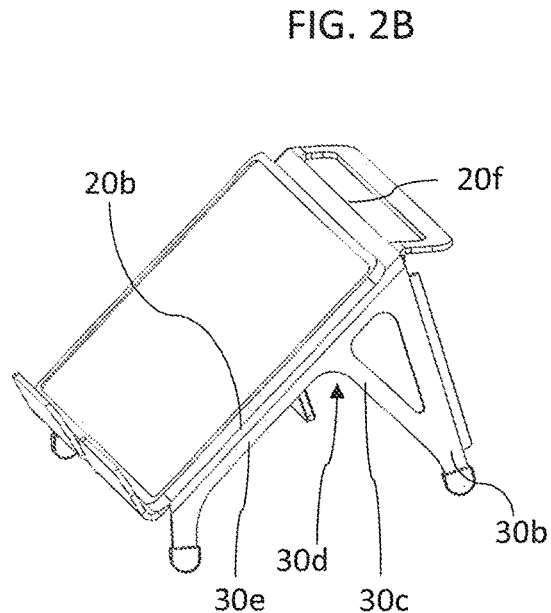
Figure 2C:
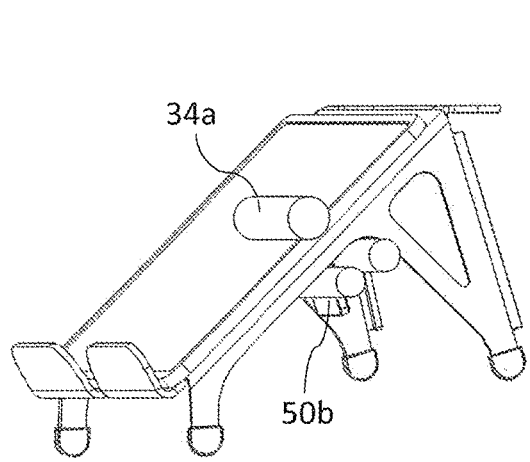
Figure 2D:
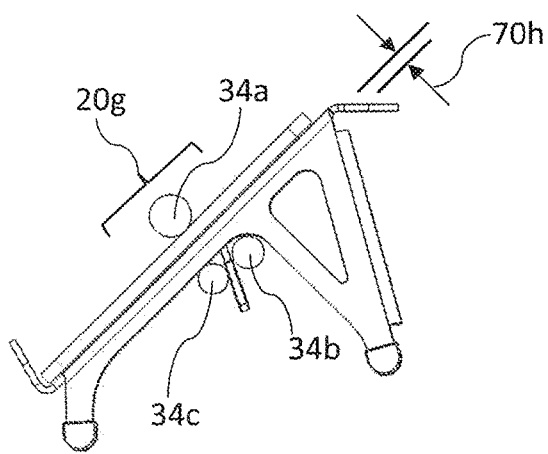

Referring now to FIGS. 2A, there is shown object 12 oriented with respect to fixture 10 followed by FIGS. 2B, 2C and 2D which illustrate various views with object 12 placed on to the planar support surface 20 and supported at the bottom thereof by retaining lip 60. As noted earlier, the transit tab 50 is accessible within finger length from the lateral edge 20b. Other features allow fixture 10 to be conveniently moved in a manner which also secures the object in place during transit. FIG. 2B shows a strut 30c that extends upwardly from right rear leg 30b and away from top edge 20f, to form a cradle 30d as it smoothly transitions in to right lateral edge 20b. The cradle forms an upper portion of a gripping position. The gripping position includes transit tab 50 and is within a middle section 20g of planar support surface. Middle section 20g includes the center of gravity when supporting a wide variety of tablets. The user's index finger 34*b* and middle finger 34*b* are place through gap 18 to sandwich transit tab therebetween, while being guided by cradle 30*d*. The user's thumb 34*a* then ergonomically rests on object 12. Another feature of the cradle is a rim or skirt 30*e* that extends downwardly from the lateral edge 20*b*. Skirt 30*e* has a height greater than the thickness of the ladder. When the ladder is present (as shown in FIG. 3C), the user's hand rests on the skirt at a position approximately under the knuckles. As the user's fingers engage the transit tab, the base of the fingers comfortably pass over the ladder since they are raised off the rear surface by the skirt. Thus the user's grasp of the planar support panel via the transit tabs is not interfered with by the presence (or absence) of the ladder. Skirt 30*e* may also function as a structural rib to stiffen or stabilize the legs as it is integral with a side section that is folded to create the legs.

As fixture 10 and object 12 are lifted, the thumb subconsciously presses down to firmly grasp the assembly. This automatically has the effect of clamping the object to the planar support panel 20 so it won't slip off even if wet or encased in a smooth protective cover. The cradle insures the hand doesn't slide up under the weight of the assembly. The index and middle finger positions on either side of transit tab keeps the lower four fingers and palm ideally located within the middle section 20*g*, at the center of gravity. Surprisingly, the object and fixture are so well balanced, that the user can freely move their hand and arm in any direction because the object feels sufficiently secured in place.

Figure 3A:
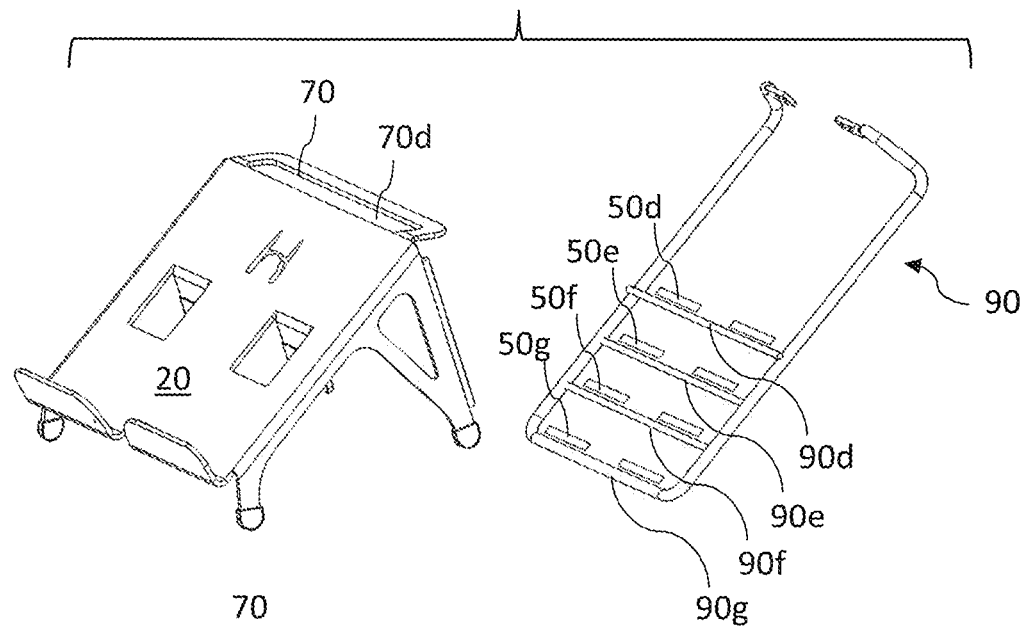
FIGS. 3A, 3B and 3C are a series of views illustrating an alternate embodiment where the fixture mounts to a ladder.
Figure 3B:
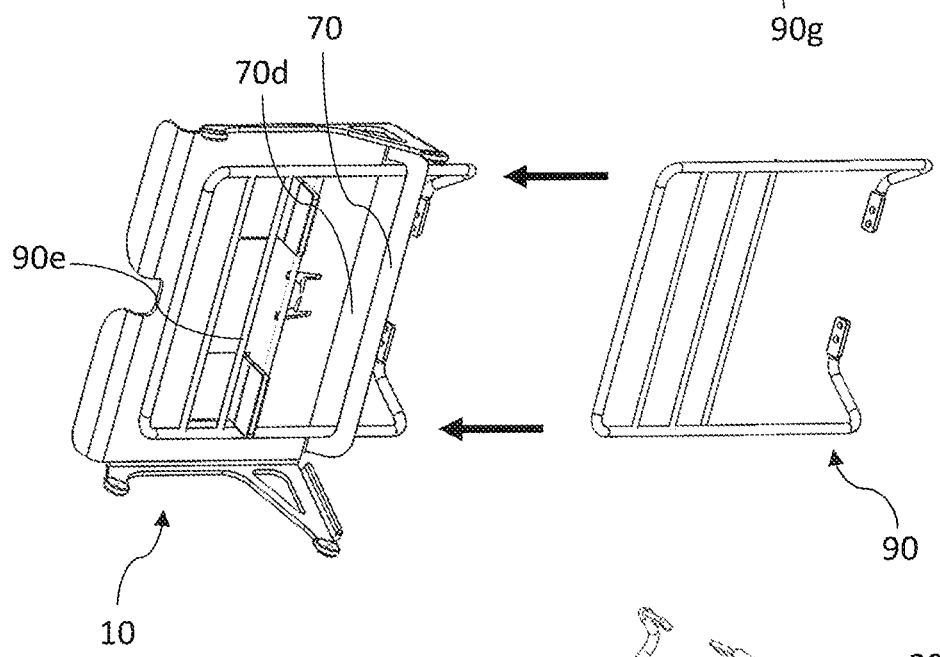
Figure 3C:
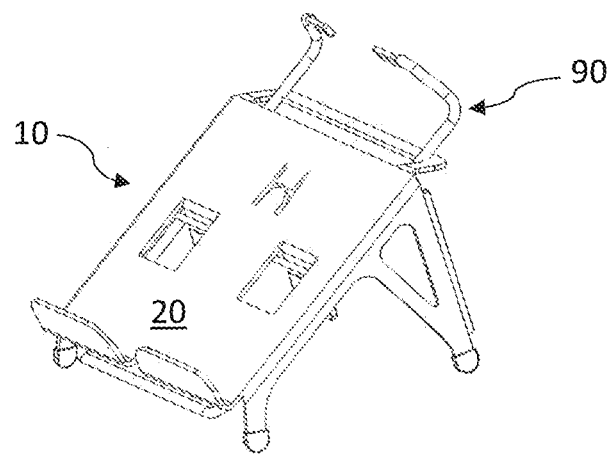

A further embodiment is shown in FIGS. 3A, 3B and 3C in which movable fixture 10 is adapted for adjustable placement on to a ladder 90 which can be suspended in a convenient viewing location, for example, beneath an upper kitchen cabinet. Ladder 90 includes one or more rungs, for example, four rungs 90*d, e, f* and *g*. Each rung has a width that is dimensioned to accommodate the one or two transit tabs, at tab locations 50*d, e, f* and *g*. The length of the ladder and number of rungs present provides a range of different heights at which movable fixture 10 can be hung. When hanging the fixture on the ladder it is desirable to have the ladder engaged at two points of contact. As will be described more fully below, the transit tab represents one point of contact. In the simplest form, a finger is spaced from the rear surface to provide a second point of contact. Stability is enhanced if the finger is spaced from the transit tab. In one practical embodiment, the handle slot comprises the finger or two fingers to capture the rails of the ladder. The finger or handle slot prevents the planar support panel from sliding left or right if imbalanced. At ladder angles nearing vertical, the finger or handle slot further prevents the top of the planar support panel from tilting away from the ladder.

To hang the fixture, the handle is positioned below the bottom edge of the ladder, so that the bottom edge of the ladder can pass above handle 70, through slot 70*d*, and behind planar support panel 20. Of course, the slot is dimensioned within the legs so that the ladder can pass without hindrance from the legs. After the ladder passes several inches through the slot, the lowermost rung 90*g* enters into engaging range with the transit tabs. The user can continue to raise movable fixture 10 until the transit tabs are above the desired rung. Then the movable fixture is pivoted down and back so that the selected run is captured between the transit tab and the rear surface of the planar support panel.

FIG. 3B shows the second rung 90*e* placed below the transit tabs, wherein the transit tabs are in tab location 50*e*. FIG. 3C shows a front view that would be presented to the user. The user can visually confirm placement of the transit tab above the selected rung by looking though the aperture that was created by bending the transit tabs out of the planar support panel. The movable fixture can be pivoted up and forward to disengage the transit tab from the rung. At that point, the user may select another tab location at another rung, or remove the fixture entirely from the ladder. The slot 70*d* is dimensioned and configured so that the planar support panel can pivot about the ladder to allow the transit tab to pass by the rungs and then allow the ladder to lie flat against the rear surface when the transit tab captures a selected rung. Proper slot dimensioning occurs in two planes. In a first plane of the handle the slot is between 3 and 5 times wider than the ladder, represented by slot width 70*f*. In a second plane of rear surface 20*c* the slot has a width several millimeters wider than the ladder, represented by the second slot width 70*h*.

Figure 4B:
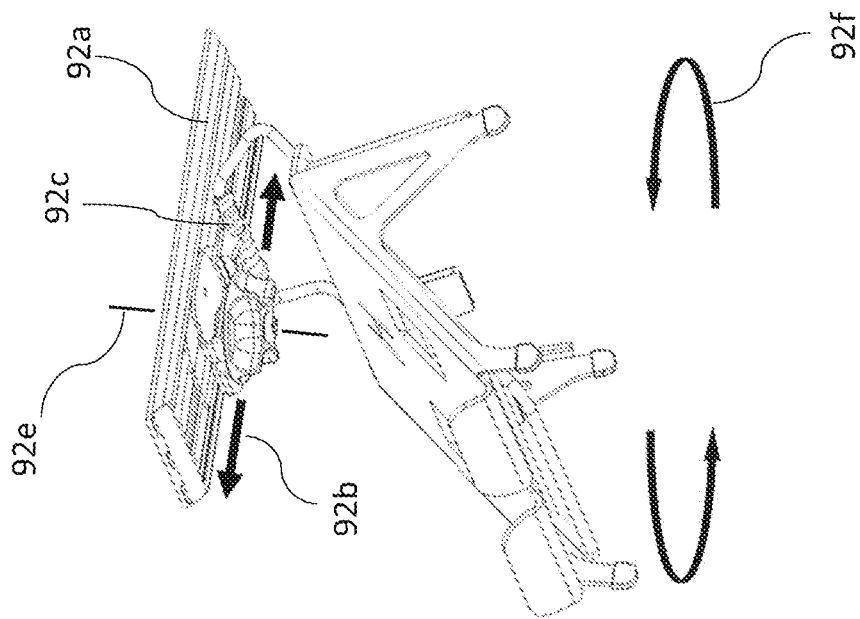
FIGS. 4A and 4B are a series of view illustrating a further embodiment where the ladder is mounted via a bracket for various degrees of movement.
Figure 4A:
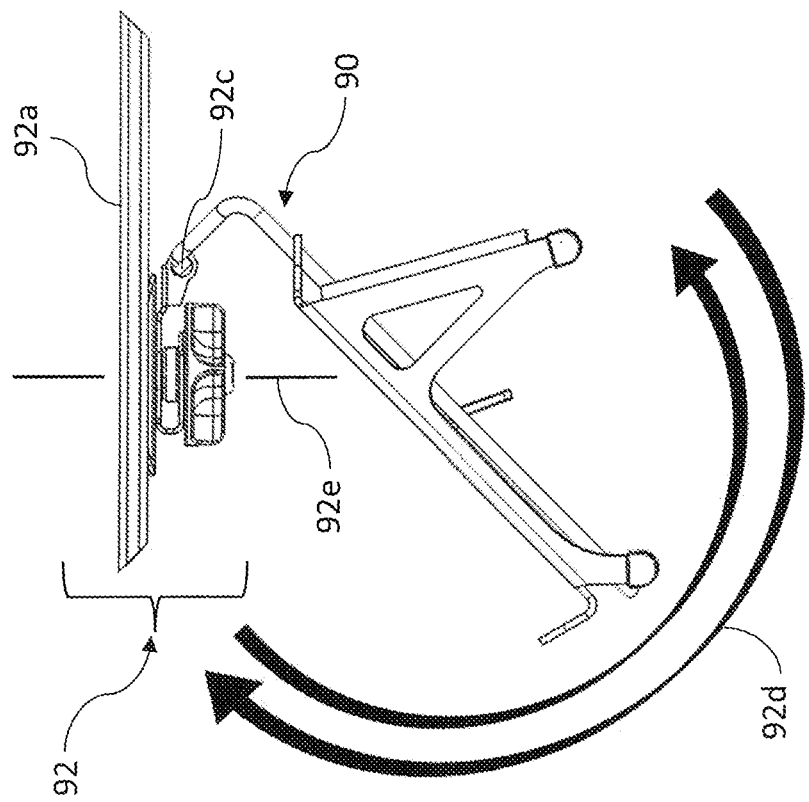

Another aspect of the ladder embodiment is the provision of a bracket to mount the ladder in a convenient, suspended or alternate location. In the simplest form, the upper end of the ladder can be attached to the underside of an upper cabinet. An intermediate form would provide a bracket with 1, 2 or 3 degrees of freedom. The bracket would attach the ladder to the cabinet and allow the ladder to pivot or rotate. FIGS. 4A and 4B illustrate an advanced form of bracket 92 in which a track 92*a* is mounted to the cabinet. Ladder 90 is slidably mounted to track 92*a* for linear movement 92*b*, for example, left and right. The track could extend the entire length of the upper cabinetry to allow linear movement 92*b* for positioning of the ladder at any location below the upper cabinetry. Another part of the bracket provides a friction hinge 92*c* to allow the ladder to pivot through various angles 92*d*, and hold at the angle selected by the user. A further part of the bracket may include an axle mount 92*e* which allows the ladder to rotate through various angular orientations 92*f*. While specific examples of bracket functionality are shown, it should be understood that alternate bracket arrangements are possible. The key is that the bracket provides 1, 2 or 3 degrees of freedom for the ladder, that is sliding, rotating or pivoting, or any combination thereof.

All of the structural features of the movable fixture shown and described can be provided as a unitary structure. For example, the fixture can be fashioned from a single piece of rigid sheet material. In a practical embodiment a sheet of metal can be trimmed and then folded to create the fixture. The trimming operation would define the overall dimensions of the fixture and create cut-outs for the handle slot, rear leg openings and transit tabs. The rigid sheet material is between about 2-4 millimeters thick, for example 3 mm thick. Trimming could be achieved by stamping or laser cutting. Thinner aluminum sheet material could be stamped, while thicker steel sheet material could be laser cut. Along the top edge, the handle would be folded away from the front surface. Along the lateral edges, the rear legs or combined front/rear legs would be folded away from the front surface. Skirt 30*e* may also function as a structural rib to stiffen or stabilize the legs as it is created with the same fold used to bend the legs into position.

Along the bottom edge the retaining lip would be folded away from the bottom surface. The transit tabs would be folded away from the front surface, toward the rear surface. Once fabricated, the fixture can be deburred. The sheet material may comprise a water resistant metal, like stainless steel. Alternatively, the finished fixture can be powder coated for water resistance and coloration.

CONCLUSIONS AND RAMIFICATIONS

In conclusion, our drawings and descriptions fully depict the invention that provides a planar support to display an object, including, but not limited to, a computer tablet or a book, at a comfortable angle for viewing and access when sitting on a horizontal surface.

The invention further includes one long unobstructed transit tab or two shorter unobstructed transit tabs for collectively gripping the object or objects and the planar support panel on which that object or objects rest to securely transport them to a different location.

The invention further provides that the transit tabs would also be positioned and sufficiently unobstructed so that they, in concert with secondary means of capture, can firmly engage rungs in a ladder arrangement with that ladder arrangement capable of being positioned in a variety of locations and orientations, providing convenient, ergonomic viewing and manipulative access to the objects being supported.

While my above description contains many detailed specifics, these should not be construed as limitations on the invention but rather as an example of preferred embodiments thereof. Many other variations are possible. For example the type and thickness of the sheet can be selected from a wide variety of materials. The dimensions and scale of the fixture can be altered while still providing different viewable support options for the object and convenient mobility.

Accordingly the scope of the invention should be determined not by the embodiments illustrated, but by the appended claims and their legal equivalents.

What is claimed is:

1. A movable fixture for supporting an object comprising:
   a planar support panel with (i) a rear surface (ii) a handle spaced from the rear surface to form a slot therebetween and (iii) left and right lateral edges with left and right rear legs extending from respective left and right lateral edges to position the planar support panel at a viewing angle when sitting on a horizontal surface; and
   a transit tab extending outwardly from the rear surface at a location that is hand-accessible through a gap bordered by one of the lateral edges and the respective rear leg;
   wherein the planar support panel is adapted to have a ladder including rungs and a pair of rails passing through the slot, and wherein the transit tab is oriented at a gripping angle that is adapted to selectively capture one of the rungs of the ladder between the transit tab and the rear surface to suspend the planar support panel at a range of different heights within a workspace.

2. The fixture according to claim 1, wherein said planar support panel has a front surface, a bottom edge and an object retaining lip along at least a portion of the bottom edge extending outwardly from said planar support panel to form an angle with the front surface between about 45 and 90 degrees.

3. The fixture according to claim 2, wherein said planar support panel further includes left and right front legs, wherein the rear legs are between about 2 to 8 times longer than the front legs.

4. The fixture according to claim 3, wherein said transit tab is hand-accessible through a gap between the front and rear legs on one side thereof.

5. The fixture according to claim 3, further including a skirt extending from a lateral edge generally perpendicular to the planar support surface in the same direction as a rear leg.

6. The fixture according to claim 5, wherein the skirt merges with a leg in a smooth curve to form a cradle which is adapted to guide and support a user's hand when accessing the transit tab.

7. The fixture according to claim 1, wherein the handle forms a handle angle with the rear surface of the planar support panel between about 110 and 160 degrees.

8. The fixture according to claim 1, wherein the handle is spaced from a top edge of the planar support panel to form a slot and wherein the fixture further includes a ladder with rungs that hangs at a viewable location within the workspace.

9. The fixture according to claim 8, wherein the slot is dimensioned and configured so that the planar support panel can pivot about the ladder so that the transit tab can pass by the rungs and then allow the ladder to lie flat against the rear surface when the transit tab captures a selected rung.

10. The fixture according to claim 9, wherein in a first plane of the handle the slot is between 3 and 5 times wider than the ladder, and wherein in a second plane of the rear surface the slot has a width several millimeters wider than the ladder.

11. The fixture according to claim 9, further including a bracket to flexibly hang the ladder in various positions.

12. The fixture according to claim 11, wherein the bracket flexible hangs the ladder in various positions selected from the group consisting of different locations, multiple rotational orientations, various angles and combinations thereof.

13. The fixture according to claim 1, wherein the handle is spaced from a top edge of the planar support panel to form the slot and wherein the left and right rear legs are spaced a distance D from each other and wherein the slot has a length less than distance D, wherein the planar support panel is adapted to have the ladder including a pair of rails positioned against the rear surface within the left and right rear legs.

14. The fixture according to claim 13, wherein said fixture consists of a single piece of rigid sheet material having a U-shaped section removed to form the transit tab.

15. The fixture according to claim 14, wherein the handle consists of a C-shaped portion of the sheet material bent away from the front surface in the direction of the rear surface, wherein the C-shaped portion is narrower than the rear legs.

16. The fixture according to claim 14, wherein the transit tab consists of a rectangular portion of the sheet material within the removed U-shaped section bent away from the front surface in the direction of the rear side, wherein the transit tab extends vertically downward when the planar support panel is sitting on a horizontal surface.

17. The fixture according to claim 1, wherein the transit tab includes a left transit tab disposed within about 1-4 inches from the left lateral edge and a right transit tab disposed within about 1-4 inches from the right lateral edge, and wherein the distance from a left side of the left transit tab to a right side of the right transit tab is less than the slot length.

18. The fixture according to claim 1, wherein the transit tab is located between a top edge and a bottom edge at a center of gravity of the planar support panel.

19. A movable fixture for supporting an object comprising:
   a planar support panel including:
      a front surface, a bottom edge and an object retaining lip along at least a portion of the bottom edge extending outwardly from said planar support panel to form an angle with the front surface between about 45 and 90 degrees;

a rear surface, left and right lateral edges with left and right rear legs extending from respective left and right lateral edges to position the planar support panel at a viewing angle when sitting on a horizontal surface, left and right front legs extending from respective left and right lateral edges, wherein the rear legs are between about 2 to 8 times longer than the front legs; and a top edge and a handle having two ends peripherally connected to the top edge at two locations near the lateral edges, wherein the handle is spaced from a central portion of the top edge to form a slot which is longer than the transit tab; and a transit tab extending outwardly from the rear surface at a location that is hand-accessible through a gap bordered by one of the lateral edges and the respective rear leg, wherein the transit tab is oriented at a gripping angle that is adapted to capture a rung of a ladder between the transit tab and the rear surface with the ladder disposed within the slot to suspend the planar support panel within a workspace.

20. A movable fixture for supporting an object comprising:

a planar support panel including:

a front surface, a bottom edge and an object retaining lip along at least a portion of the bottom edge extending outwardly from said planar support panel to form an angle with the front surface between about 45 and 90 degrees;

a rear surface having a handle spaced from the rear surface to form a slot therebetween, left and right lateral edges with left and right rear legs extending from respective left and right lateral edges to position the planar support panel at a viewing angle when sitting on a horizontal surface, left and right front legs extending from respective left and right lateral edges, wherein the rear legs are between about 2 to 8 times longer than the front legs, a skirt extending from a lateral edge generally perpendicular to the planar support surface in the same direction as a rear leg and a cradle at a lateral edge; and a transit tab extending outwardly from the rear surface at a location that is hand-accessible through a gap bordered by one of the lateral edges and the respective rear leg, wherein the cradle is adapted to guide and support a user's hand when accessing the transit tab, wherein the transit tab is oriented at a gripping angle that is adapted to capture a rung of a ladder between the transit tab and the rear surface with the ladder disposed within the slot to suspend the planar support panel within a workspace.

\* \* \* \* \*